US011233468B2

(12) United States Patent
Kilian et al.

(10) Patent No.: US 11,233,468 B2
(45) Date of Patent: Jan. 25, 2022

(54) MULTI-MOTOR OPERATION

(71) Applicant: ebm-papst Mulfingen GmbH & Co. KG, Mulfingen (DE)

(72) Inventors: Thomas Kilian, Krautheim (DE); Sebastian Schroth, Kupferzell (DE); Marco Weckert, Bad Mergentheim (DE); Georg Wiedmann, Ilshofen (DE); Ralph Wystup, Künzelsau (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 0 days.

(21) Appl. No.: 16/757,383

(22) PCT Filed: Oct. 26, 2018

(86) PCT No.: PCT/EP2018/079508
§ 371 (c)(1),
(2) Date: Apr. 18, 2020

(87) PCT Pub. No.: WO2019/081768
PCT Pub. Date: May 2, 2019

(65) Prior Publication Data
US 2020/0252011 A1    Aug. 6, 2020

(30) Foreign Application Priority Data
Oct. 27, 2017  (DE) .................... 10 2017 125 317.3

(51) Int. Cl.
*H02P 1/54* (2006.01)
*H02P 5/46* (2006.01)
(Continued)

(52) U.S. Cl.
CPC ................. *H02P 5/46* (2013.01); *H02P 5/74* (2013.01); *H02P 6/04* (2013.01); *H02P 21/18* (2016.02);
(Continued)

(58) Field of Classification Search
CPC .... H02P 5/46; H02P 6/04; H02P 21/18; H02P 5/74; H02P 5/50; H02P 6/14
See application file for complete search history.

(56) References Cited

U.S. PATENT DOCUMENTS 5,184,057 A * 2/1993 Sakai .................. H02M 5/4585
                                                      318/801
2017/0257048 A1   9/2017 Tang et al.

FOREIGN PATENT DOCUMENTS

EP    3091653 A1   11/2016
ER    2905891 A1   8/2015

OTHER PUBLICATIONS

International Search Report (in English and German) and Written Opinion (In German) in corresponding PCT Application No. PCT/EP2018/079508 dated Jan. 29, 2019; ISA/EP.

* cited by examiner

*Primary Examiner* — Karen Masih
(74) *Attorney, Agent, or Firm* — Harness, Dickey & Pierce, P.L.C.

(57) ABSTRACT

The invention relates to a method for the closed-loop and open-loop control of two or more EC motors operated using a common converter, wherein for the purpose of setting the operating point of the EC motors, common open-loop or closed-loop control using at least one controller is provided, wherein a combination of at least two control options is provided and in this case a controlled variable regulates the voltage setting at the output of the converter such that the two or more EC motors follow an intended sequence of operating points in a stable manner.

11 Claims, 3 Drawing Sheets

(51) Int. Cl.
*H02P 21/18* (2016.01)
*H02P 21/22* (2016.01)
*H02P 5/74* (2006.01)
*H02P 6/04* (2016.01)
*H02P 27/06* (2006.01)

(52) U.S. Cl.
CPC .............. *H02P 21/22* (2016.02); *H02P 27/06* (2013.01); *H02P 2006/045* (2013.01)

MULTI-MOTOR OPERATION

CROSS REFERENCE TO RELATED APPLICATIONS

This application is a U.S. National Phase Application under 35 U.S.C. 371 of International Application No. PCT/EP2018/079508 filed Oct. 26, 2018 and published in German as WO 2019/081768 A1 on May 2, 2019. This application claims priority to German Application No. 10 2017 125 317.3 filed on Oct. 27, 2017. The entire disclosures of all of the above applications are incorporated herein by reference.

FIELD

The disclosure relates to a method for operating multiple electronically commuted motors (EC motors) using a single converter.

In the prior art, one converter, such as an inverter or frequency converter is typically used to operate each electronically commuted motor. If multiple motors are needed for an application, the use of just a joint converter could save costs. The prior art already gives some indications how multiple motors can be actuated as a master-slave system. The publication by Yongjae Lee and J. I. Ha, "Minimization of stator currents for mono inverter dual parallel PMSM drive system", 2014 International Power Electronic Conference (IPEC—Hiroshima 2014—ECCE ASIA) pp. 3140-3144, describes a control method and the type and manner of controlling machines connected in parallel. A current controller is used for generating a d-current portion in the respective d/q system.

The publication by D. Bidart, M. Pietrzak-David, P. Maussion, and M. Fadel, "Mono inverter multi-parallel permanent magnet synchronous motor: structure and control strategy", in IET Electric Power Applications, vol. 5, no. 3, pp. 288-294, March 2011 describes a closed-loop control solution for operating multiple PMSMs. Here a reference motor is used for closed-loop control, and the manner in which the reference motor required for closed-loop control is determined dynamically at runtime. That motor is selected as the reference motor from the multiple PMSMs where the highest torque is applied.

There is a demand for further optimization of the closed-loop control of two or more EC motors to reduce the cost of the necessary electronics and to optimize the mode of operation of the motors.

SUMMARY

It is therefore an object of the present disclosure to provide a method allowing the operation of two or more motors using one converter. It is aimed at achieving a reliable and stable closed-loop control behavior of the motors involved.

This problem is solved by a method for a closed-loop and open-loop control of two or more EC motors operated using a common converter for setting the operating point of the EC motors comprising:

providing a common open-loop or closed-loop control using at least one controller;

providing a combination of at least one control option and one sub-option;

a controlled variable regulating a voltage setting at an output of the converter; and in operating the two or more EC motors having a stable operating point or following an intended sequence of operating points in a stable manner.

In one aspect of the disclosure, the closed-loop control method is designed such that the voltage setting at the output of the converter is regulated by an angle and speed evaluation in such a manner that the two or more EC motors have a stable operating point when in operation or follow an intended sequence of operating points.

This can be achieved using one of the following three control options. Control option 1: changing the amplitude of the output voltage of the converter; Control option 2: changing the phase position of the output voltage of the converter; and Control option 3: changing the amplitude and phase position of the output voltage of the converter, preferably combined with a respective one of the following sub-options.

Control options 1, 2, and 3, as used herein, are considered primary control options. The sub-options are considered secondary options. Thus initially one of the three primary control options is selected, then secondary options, hereinafter called "sub-options."

According to the disclosure, sub-options proposed include the use of a motor reference system for closed-loop control, to set the operating point by a speed controller, the degree of level control, or by mere current control, and/or to ensure a or the preferred operating point by phase control, a mathematical control function, or value allocation tables. This results in the following sub-options: Sub-option 1: selecting the reference motor/reference system, sub-option 2: selecting the operating point, and sub-option 3: ensuring a or the preferred operating point.

Regarding sub-option 1, it is optionally the motor with the highest speed, the motor with the lowest speed, any motor of the multiple EC motors included in the system. Alternatively, a fictitious reference motor which is used as a motor reference system. The selection of the reference motor in the control or closed-loop control system substantially influences the static and dynamic stability of the system as well as the efficiency with which the motors or the entire system can be operated.

In an advantageous embodiment of the disclosure, the most leading motor with reference to the phase position, which is also the motor having the smallest load, is used as the reference motor for controlling the motor system. This motor at the same time is the motor that is subject to the greatest field enhancement in the magnetic field. All other motors are meanwhile subject to a lesser field enhancement or field weakening. Thus, they produce a higher torque than the leading motor.

In an alternative embodiment, the most trailing motor, which at the same time is the motor having the highest load, is used as reference motor. This motor at the same time is the motor that is subject to the greatest field weakening in the field. If, however, the field enhancement operating mode is used, this motor will be subject to the lowest field enhancement. All other motors controlled by the same converter in the system are subject to a lower field weakening or to a field enhancement. Thus, the motors generate a smaller torque than the trailing reference motor.

In another alternative embodiment, a motor selected at random is used as reference motor in the system. In such a control topology, one of the EC motors actuated by the converter can be set to its optimum operating point. Accordingly, the other motors are leading or trailing motors based on phase position.

Alternatively, the respective reference motor in the control method for controlling the EC motors operated using the converter can be changed dynamically. Thus, depending on operating behavior, another motor is used as the reference motor, respectively.

In another control option of the control method, a fictitious motor is used as the reference motor. The angular position is, for example, determined by suitable weighting of all angular positions of all motors operated using the converter. The fictitious motor thus receives a theoretical phase shift, that results from the sum total of angular positions of several or all EC motors running at the same converter.

Such weighting of the angular positions of the motors involved allows the implementation of manifold setting and control options. In this manner, the most efficient operating point of the entire drive system, the control reserve of a specific motor or of the entire system, can be set based on the weighting.

The reference coordinate system relevant for control results from the selection of the reference motor. When using a field-oriented coordinate system or a coordinate system that is fixed with respect to the rotor, such system is not unambiguously determined when multiple EC motors are connected to a joint converter. Each EC motor has its own coordinate system that is fixed with respect to the rotor. If different loads of the EC motors and/or deviating motor parameters are added, the coordinate systems all deviate from each other, both statically and dynamically. Depending on the actuation of the operating point based on speed control, degree of level control, or mere current control, the respective reference coordinate system and its transformation angle $\gamma_{ref}$ result from the respective selection of the reference motor.

The electrical variables in the control system are exclusively described within this reference coordinate system that depends on the reference motor selected.

The output voltage indicator Uxy to be provided by the converter, is composed of the variables Ux and Uy, that are perpendicular. In the special case where no field weakening is provided, such that the voltage indicator u and the current indicator i of the converter are offset precisely by the load angle φ, the field-oriented voltage indicator Udq in the reference coordinate system is derived by (Clark/Park) transformation of the voltage indicator Uxy with the angle $\gamma_{ref}+\varphi$ and subsequent back transformation with the angle $\gamma_{ref}$.

The following design options are available as sub-option 2 with respect to the above mentioned aspect of selecting the operating point. A speed controller can be used for periodically or continuously comparing the actual and the target speed. This ensures that the EC motors are kept at their desired operating points by means of the output voltage at the converter.

Alternatively, the desired operating point can be achieved by specifying a fixed degree of level control or duty cycle by the converter. The operating point is then achieved automatically.

Another advantage is a control operation where an operating point is selected using a current controller. This current controller sets the desired target current on the motor windings. This can for example be required if the motor is to be operated as a load machine.

The following design options are available as sub-option 3 with respect to the above mentioned aspect of ensuring the preferred operating point. As a preselection for the control method, a decisive first step is the suitable selection of the reference system. Here, in the reference motor, the operating values (such as speed or phase position) are used as the reference during normal operation in order to achieve the preferred operation. When using a current phase controller, this device will ensure that the resulting current contains precisely the required d-current portion in the dq system. The preferred operating point in normal operation is achieved by this action. To this end, the current phase controller sets the phase angle Δγ at its output. This angle Δγ corresponds exactly to the phase shift φ resulting from the motor load of the reference motor in the steady state of the reference motor. This angle may alternatively be determined using a suitable mathematical function (e.g. a function of the load and speed of the motor) in order to achieve a preferred operating point.

Alternatively, the optimum operating point can be controlled in that a value table is used with respective correlation values between the angle needed and the operating point. The table ensures that the angle needed for the preferred operating point is suitably set.

Other advantageous further developments of the disclosure are illustrated in the dependent claims or are explained in more detail below with reference to the figures and together with a preferred embodiment.

DETAILED DESCRIPTION

Figure 1:
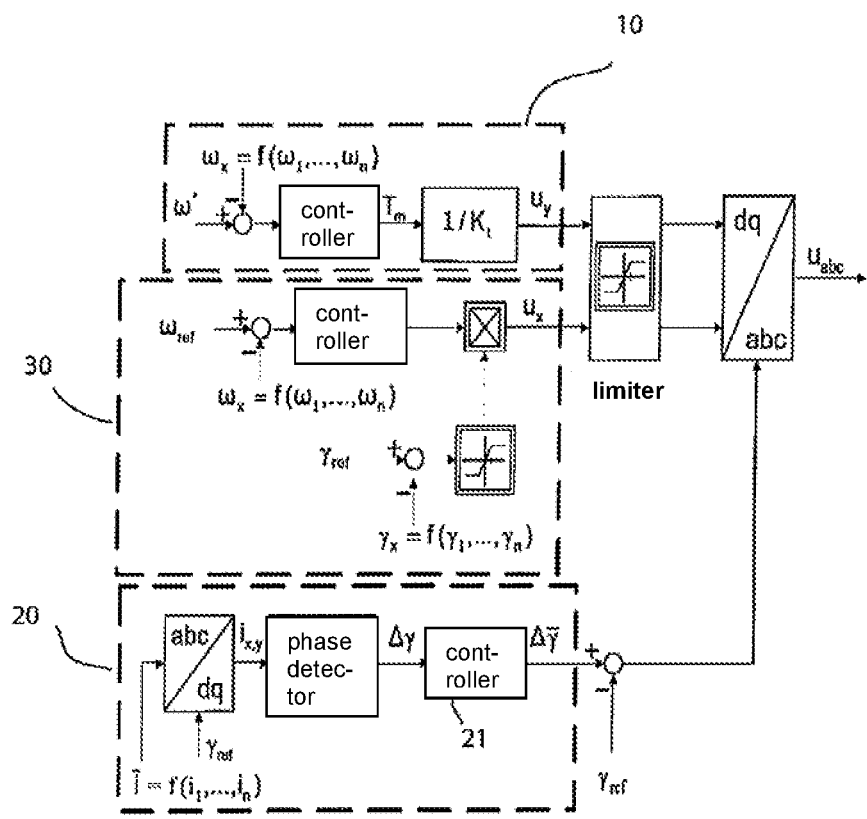
FIG. 1 is a schematic view of a control diagram of a first embodiment.

The disclosure is described in more detail below with reference to FIGS. 1 to 6. The same reference numerals indicate the same structural and/or functional features.

FIG. 1 shows a control diagram of a first embodiment using control option 3: changing the amplitude and phase position of the output voltage of the converter.

As a first sub-option, the motor having the highest speed was used as a reference motor. As a second sub-option for setting the operating point, speed was controlled using the speed controller 10 shown in FIG. 1. As a third sub-option, current phase controlling was used to set the phase angle Δγ at the output, namely for controlling the field-oriented current indicator in the dq reference coordinate system using a phase controller 20.

In the exemplary embodiment shown here, the fastest motor, the motor with the smallest load, is used as reference motor. It is at the same time, the reference for the reference coordinate system. Selecting the fastest or the least loaded motor as reference motor ensures the highest dynamics in the closed-loop control system.

In another step, the way in which the operating point is to be set is specified. In the case shown here, a speed controller is used. By specifying a target speed ω*, the speed controller 10 (here in the form of a PI controller) calculates a target voltage u by comparison to the returned weighted speeds of all motors $\omega_x$. This just leads to a voltage in the q direction in the dq coordinate system at the reference motor by transformation with the phase angle $\gamma_{ref}$ (that is, without taking into account a phase correction). If the equivalent circuit diagram of the EC motors is taken into account, this voltage results in an emerging field-producing current portion in the d direction and to another torque-producing current portion in the q direction. The other motors are thus subjected to a moment and reach a stable operating point. This operating point is typically not the most efficient operating point due to the uninfluenced d portion. To this end, the phase position and thus the phase angle of the output voltage at the converter must be adequately adjusted.

To adjust the phase position and thus to set a preferred operating point, a phase controller 20 is used in this embodiment. The phase controller 20 ensures the desired phase position of the current. The phase controller 20 determines the current field-oriented portions of the current in the d direction and the q direction relative to the dq reference coordinate system. This occurs by a suitable weighting of the measured currents $i_x$ (in the most simple case just $i_{converter}$). The deviation from the target value determined by the phase controller is sent to a controller (e.g. a PI controller). The value $\Delta\bar{\gamma}$ for the phase angle calculated by the controller 21 now ensures in the steady state that the d current desired from the point of view of the reference system is set.

The different load of the EC motors or deviating motor parameters of the respective EC motors can result in difference in speed or angles of rotation of the individual motors. This is when the stabilizing controller 30 shown in FIG. 1 comes into play. If the system was in the steady state before the deviation occurred, this means that $u_y$ points exactly into the direction of $i_q$. Depending on the magnitude of the differences in speed and angle of rotation, the stabilizing controller now calculates a voltage ux, that is perpendicular to the voltage uy, determined by the speed controller and thus also perpendicular to iq. In the first moment, this voltage generates a purely field-producing current. If one of the EC motors trails the reference motor, a negative ux=ud voltage indicator is set. It generates a purely field-weakening effect in the faster running reference motor. This only has a small impact on the torque produced in the reference motor. Due to the difference in angles of rotation, both a field-weakening effect and a torque-producing effect are generated in the trailing motor. This results in an increase in torque-producing current in the trailing motor. The trailing motor is thereby accelerated. The speed difference reduces along the control section, preferably down to zero. This control method inversely has a braking effect on motors which lead with respect to the reference motor.

If therefore one of the EC motors trails the reference motor, the correction angle determined ensures additional torsion of the voltage indicator set. As a result, all trailing motors undergo a negative change in the d-current portion. Thus, these motors produce a greater torque than in the preceding uncorrected operating point. These motors are thus accelerated or increase their speed, respectively.

Likewise, a positive change in the d-current portion is caused in all leading EC motors. Thus, these EC motors produce a smaller torque than in the previous operating point and are braked.

Figure 2:
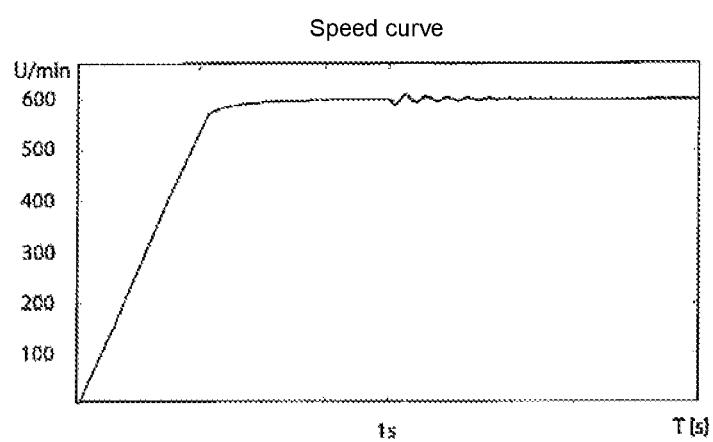
FIG. 2 is a graph of the speed curves of three EC motors at a converter according to the first exemplary embodiment.
Figure 3:
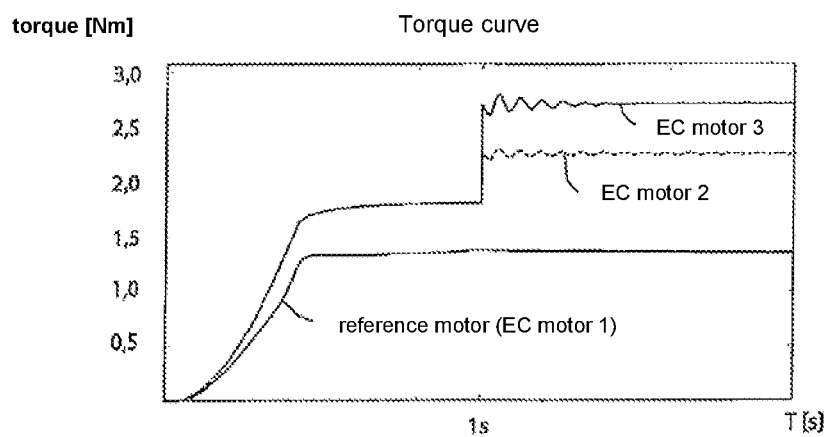
FIG. 3 is a graph of the torque curves of three EC motors at a converter according to the first exemplary embodiment, wherein an exemplary load step takes place in two of the three motors at the time t=1 s.
Figure 4:
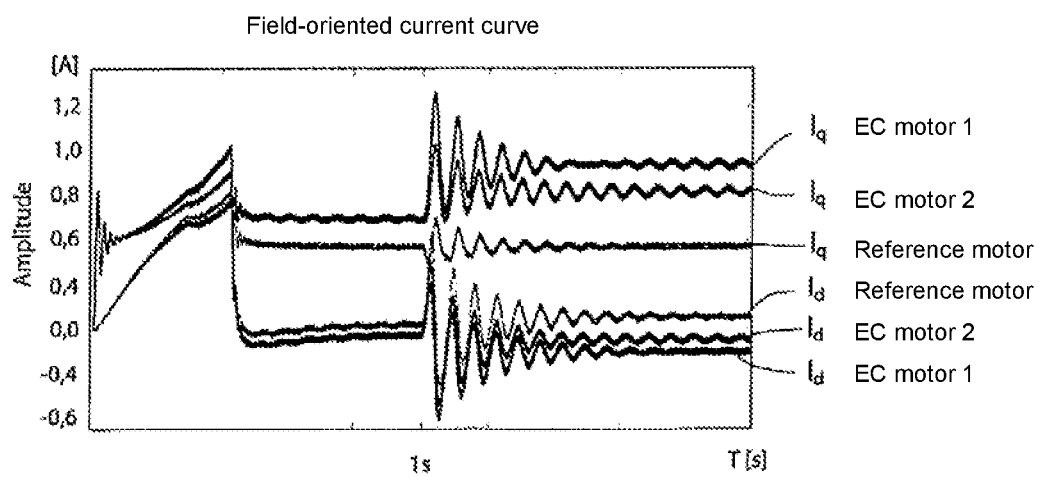
FIG. 4 is a graph of the field oriented current curves of three EC motors at a converter according to the first exemplary embodiment and the exemplary load curve according to FIG. 3.

The illustrations in FIGS. 2, 3, and 4 show the torque curves, the speed curves, and the field-oriented current curves of three exemplary EC motors connected in parallel using one converter in regular operation according to the first exemplary embodiment.

Figure 5:
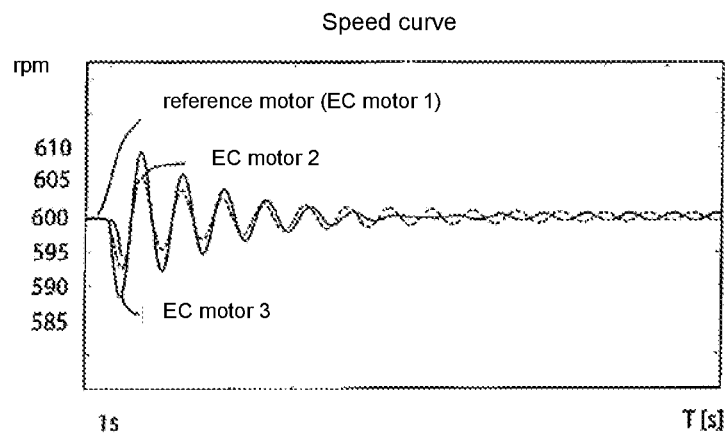
FIG. 5 is a graph of the speed curves of the three EC motors at the converter according to the first exemplary embodiment and the exemplary load curve according to FIG. 3.

As shown in FIG. 2, the EC motors are started from standstill up to a speed of 600 rpm, that is reached at t=0.4 s after the start. The reference motor is the fastest EC motor. At the time t=1 s, the two other EC motors undergo different load steps, as shown in FIG. 3. results in a speed deviation as shown in FIG. 5. These load steps are absorbed by the stabilizing controller shown in FIG. 1. The phase controller subsequently ensures minimization of the resulting d-current. For the field-oriented current curve, see FIG. 4.

Figure 6:
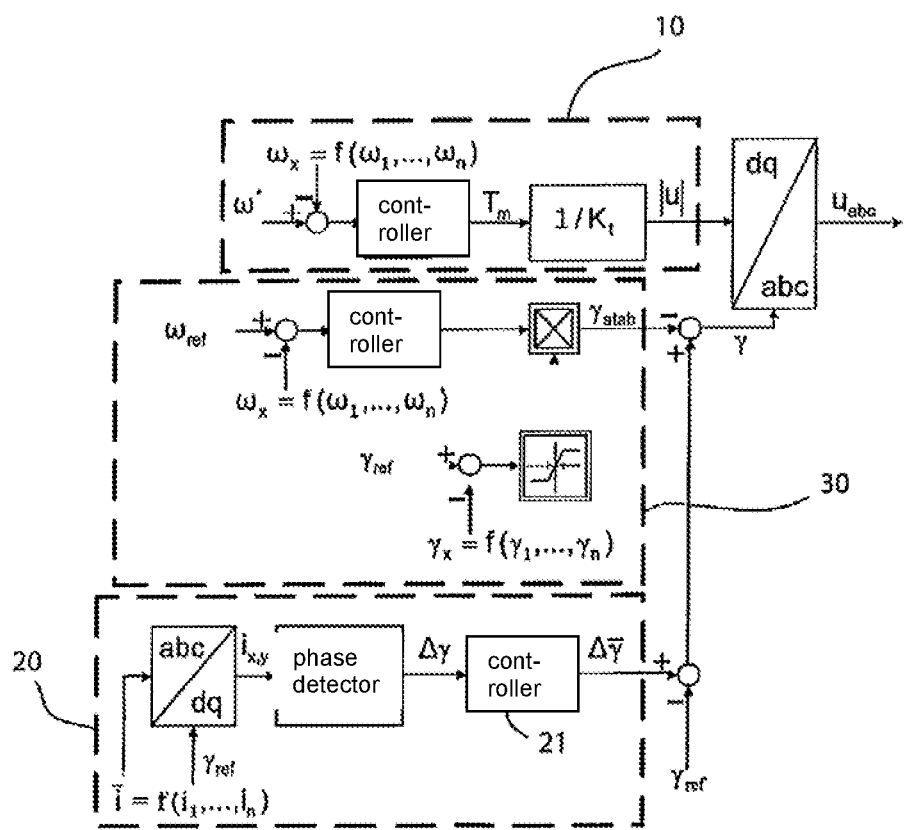
FIG. 6 is a schematic view of a control diagram of an alternative embodiment.

FIG. 6 shows a control diagram for a second embodiment of the disclosure with another control topology. Here, control option 2: changing the phase position of the output voltage of the converter, is applied. Like in the first exemplary embodiment, sub-options used were using the motor with the highest speed as reference motor, setting an operating point by means of speed control, and setting a preferred operating point by phase control. This embodiment further includes a voltage limiter.

As explained for the first exemplary embodiment, different motor loads or deviating motor parameters can result in differences in speeds and angles of rotation of the EC motors. The stabilizing controller calculates a correction angle $\gamma_{stab}$ depending on the differences in speed and angle of rotation. If one of the EC motors trails the reference motor, the correction angle determined ensures additional torsion of the voltage indicator set. As a result, all trailing motors undergo a negative change in the d-current portion. Thus, these motors produce a greater torque than in the preceding uncorrected operating point. These motors are thus accelerated or increase their speed, respectively. Likewise, a positive change in the d-current portion is caused in all leading EC motors. Thus, these EC motors produce a smaller torque than in the previous operating point and are thus braked.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for a closed-loop and open-loop control of two or more EC motors operated using one converter for setting the operating point of the EC motors comprising:
   providing a common open-loop or closed-loop control using at least one controller;
   providing a combination of at least one control option and one sub-option for the at least one control option;
   a controlled variable regulating a voltage setting at an output of the converter; and
   operating the two or more EC motors having at least one of (a) a stable operating point and (b) following an intended sequence of operating points in a stable manner.

2. The method according to claim 1, according to the sub-option, selecting a suitable reference motor for controlling the operating points of the EC motors.

3. The method according to claim 2, wherein the motor used as the reference motor in the motor reference system is one of the motor with the highest speed, the motor with the lowest speed, a motor with a speed that is not the highest speed or the lowest speed, a weighted combination of multiple EC motors, or a factitious reference motor.

4. The method according to claim 1 further comprising setting the voltage setting at the output of the converter by an angle and speed difference evaluation between the reference motor and at least one other EC motor.

5. The method according to claim 1 further comprising a using change in amplitude of the output voltage at the converter, a change in phase position of the output voltage at the converter, or a change in amplitude and phase position of the output voltage at the converter as the controlled variable for regulating a preferred operating point of the EC motors.

6. The method according to claim 5, wherein another sub-option is combined with the control option and speed control, adjustment of the degree of level control, or mere current control are used as the another sub-option.

7. The method according to claim 1, further comprising ensuring the stable operating point as an efficient operating point of the EC motors via current phase control, a mathematical function, or value allocation tables, as another sub-option.

8. The method according to claim 4, wherein via a speed controller and by periodically or continuously comparing the actual and the target speeds that the EC motors follow any sequence of operating points via the control of the output voltage of the converter in a stable manner.

9. The method according to claim 4, further comprising setting the desired operating point of the EC motors by specifying a fixed degree of level control or duty cycle by the converter.

10. The method according to claim 7, wherein for ensuring the preferred operating point using current phase control, the resulting current to be controlled by current phase control contains the required d-current portion in a dq coordinate system, the current phase controller for this purpose sets the phase angle $\Delta\gamma$ at its output, which in the steady state of the motor corresponds exactly to the phase shift $\varphi$ resulting from the motor load.

11. A method for a closed-loop and open-loop control of two or more EC motors operated using one converter for setting the operating point of the EC motors comprising:
   providing a common open-loop or closed-loop control using at least one controller;
   providing a combination of at least one control option and one sub-option;
   a controlled variable regulating a voltage setting at an output of the converter;
   operating the two or more EC motors having at least one of (a) a stable operating point and (b) following an intended sequence of operating points in a stable manner; and
   setting the voltage setting at the output of the converter by an angle and speed difference evaluation between a reference motor and at least one other EC motor.

* * * * *